No. 731,159. PATENTED JUNE 16, 1903.
W. F. BOARDMAN & F. H. JACKSON.
SPHERICAL PIPE JOINT AND STUFFING BOX.
APPLICATION FILED MAR. 4, 1903.
NO MODEL.
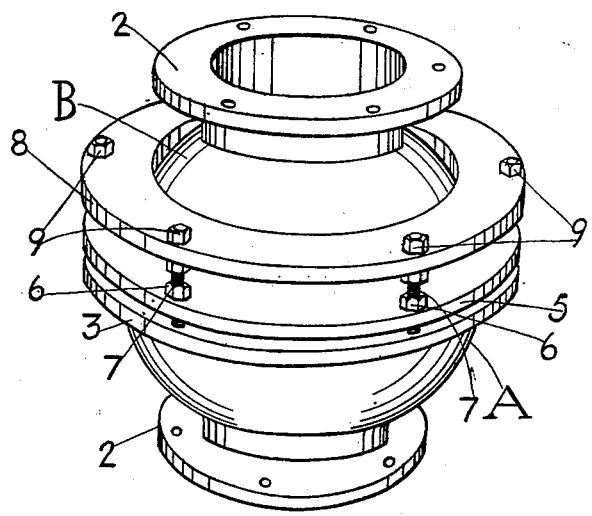
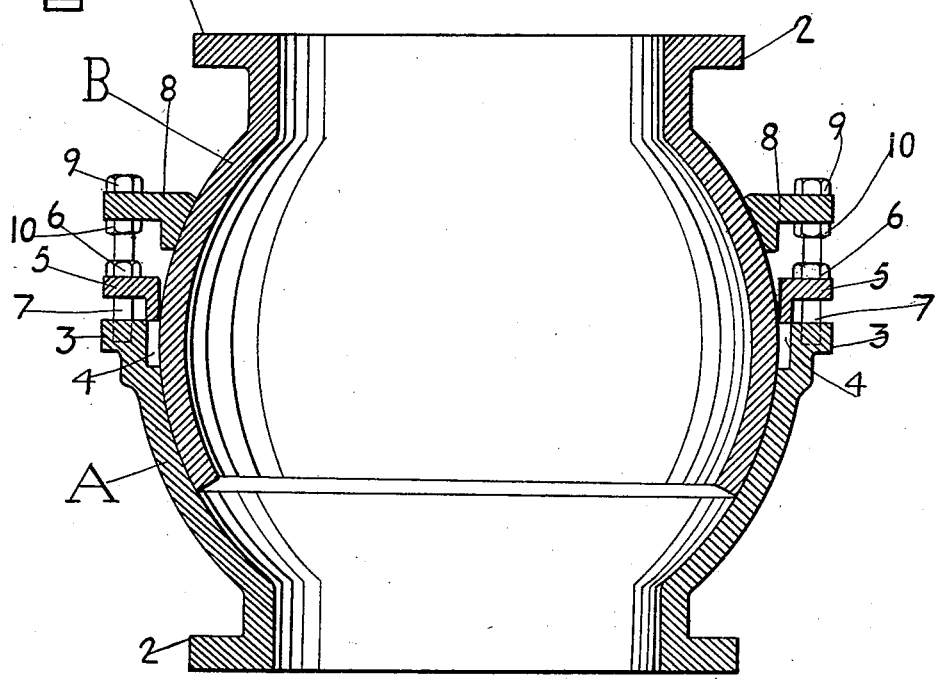
WITNESSES:
INVENTORS
William F. Boardman
Frank H. Jackson
BY Geo. H. Strong,
ATTORNEY.

No. 731,159. Patented June 16, 1903.

UNITED STATES PATENT OFFICE.

WILLIAM F. BOARDMAN AND FRANK H. JACKSON, OF SAN FRANCISCO, CALIFORNIA; SAID JACKSON ASSIGNOR TO BYRON JACKSON, OF SAN FRANCISCO, CALIFORNIA.

SPHERICAL PIPE-JOINT AND STUFFING-BOX.

SPECIFICATION forming part of Letters Patent No. 731,159, dated June 16, 1903.

Application filed March 4, 1903. Serial No. 146,060. (No model.)

*To all whom it may concern:*

Be it known that we, WILLIAM F. BOARDMAN and FRANK H. JACKSON, citizens of the United States, residing in the city and county of San Francisco, State of California, have invented an Improvement in Spherical Pipe-Joints and Stuffing-Boxes; and we hereby declare the following to be a full, clear, and exact description of the same.

Our invention relates to an improvement in what are known as "ball" or "spherical" joints for pipe-couplings; and it consists in the application of a stuffing-box whereby a tight joint may be maintained in this class of joints whatever turn or change of angle may be made and means by which the two spherical segments of the joint may be held together while the gland may be removed and the packing adjusted.

It also comprises details of construction, which will be more fully explained by reference to the accompanying drawings, in which—

Figure 1 is a perspective view of my invention. Fig. 2 is a vertical section of same.

What are known as "ball-joints" for pipe-sections, which allow of a universal adjustment of the two meeting parts of the pipe, are usually made of two spherical segments, one connected with one portion of the pipe, the other with the other portion, and the second fits into the first one and is retained in place by an annular flange smaller than its greatest diameter and connected by bolts with a flange upon the first member, so that the second globular or spherical segment is turnable within the first member and the holding-flange and is prevented by the latter from separation. A packing-joint of some sort is necessary to prevent leakage at such joints, and it is the object of my invention to so construct such a joint that it may be opened, adjusted, or renewed without releasing or loosening the connections by which the segments of the joint are held together and in place.

As shown in the accompanying drawings, A represents the outside and B the inside members of the ball-joint for pipe connections, these having flanges, as shown at 2, for connection with the respective pipe sections, of which they are continuations. The section A has an annular flange around its upper edge, as shown at 3, and an annular groove or channel 4 around the inner periphery, which is adapted to contain any suitable packing. The outer surface of the part B being finished and smooth, it will be turnable within this packing and maintain a perfectly tight joint, which will allow the pipe to be used either under a vacuum, or under a considerable pressure when used as a discharge-pipe.

5 is an annular gland which is adapted to fit into the stuffing-box channel 4, and it is screwed down, as may be desired, by nuts 6, threaded upon bolts 7.

8 is an annular ring fitting the member B of the joint at a point less than its greatest diameter, and the flange of this ring is connected with the flange 3 of the member A by the bolts 7, passing through the two and also through the flange of the annular gland 5, so that the bolts or studs 7 may be screwed into the flange 3 and nuts 9 screwed upon their outer ends, or they may have fixed heads upon the outer ends and the adjustment made by screwing them into the flange 3.

Intermediate nuts 10 are turnable upon the screws 7 to lock the flange 8 against the nuts 9. This makes a rigid and inseparable connection between the two segments and allows the gland 5 to be retracted to open the channel 4 without disturbing the connection of the two joint-sections and connected pipes. This is done by retracting the gland-holding nuts 6 upon the screws 7 until the gland may be pushed back sufficiently to expose the channel 4. This does not loosen the screws or the nuts by which the two parts of the joint are held together.

This device is equally applicable to other similar forms of packed joints.

Having thus described our invention, what we claim, and desire to secure by Letters Patent, is—

1. A pipe-joint consisting of outer and inner spherical members, one movable within the other, an annular channel made in the inner periphery of the first member, an annular gland surrounding the second member and fitting into said channel, and a ring inclosing the second member and screw-studs and nuts securing it to the flange of the first member, said studs passing through the gland-flange, and independent nuts turnable upon the screw-studs to adjust the gland without disturbing the joint connection.

2. The combination in a spherical pipe-joint of exterior and interior globular, spherical sections, a ring and studs by which the two members are held together, an annular stuffing-box channel formed in the outer member and an independent annular gland and means for adjusting it in the stuffing-box independently of the permanent joint connections.

In witness whereof we have hereunto set our hands.

WILLIAM F. BOARDMAN.
FRANK H. JACKSON.

Witnesses:
S. H. NOURSE,
JESSIE C. BRODIE.